(12) United States Patent
Karlsson

(10) Patent No.: US 10,149,019 B2
(45) Date of Patent: Dec. 4, 2018

(54) SYSTEM FOR PROVIDING DATA COMMUNICATION OVER A COAXIAL NETWORK

(71) Applicant: InCoax Networks Europe AB, Gävle (SE)

(72) Inventor: Carl Karlsson, Sandviken (SE)

(73) Assignee: INCOAX NETWORKS AB, Gävle (SE)

( * ) Notice: Subject to any disclaimer, the term of this patent is extended or adjusted under 35 U.S.C. 154(b) by 20 days.

(21) Appl. No.: 15/341,739

(22) Filed: Nov. 2, 2016

(65) Prior Publication Data

US 2018/0014080 A1  Jan. 11, 2018

(30) Foreign Application Priority Data

Jul. 8, 2016  (EP) .................................... 16178618

(51) Int. Cl.
| | |
|---|---|
| *H04L 12/24* | (2006.01) |
| *H04N 21/435* | (2011.01) |
| *H04N 21/61* | (2011.01) |
| *H04L 12/28* | (2006.01) |
| *H04W 84/12* | (2009.01) |

(52) U.S. Cl.
CPC ....... *H04N 21/6118* (2013.01); *H04L 12/283* (2013.01); *H04L 12/2834* (2013.01); *H04L 12/2836* (2013.01); *H04L 12/2856* (2013.01); *H04L 41/24* (2013.01);
(Continued)

(58) Field of Classification Search
CPC .... H04N 5/4401; H04N 5/50; H04N 7/17309; H04N 7/17318; H04N 7/17354
See application file for complete search history.

(56) References Cited

U.S. PATENT DOCUMENTS

| | | | | |
|---|---|---|---|---|
| 2009/0180782 A1* | 7/2009 | Bernard | ........... | H04B 10/25751 398/140 |
| 2013/0133012 A1 | 5/2013 | Ling et al. | | |

(Continued)

FOREIGN PATENT DOCUMENTS

CN  102412992 A  4/2012

OTHER PUBLICATIONS

European Search Report for European Application No. 16178618.1, dated Nov. 14, 2016.
(Continued)

*Primary Examiner* — Kieu Oanh T Bui
(74) *Attorney, Agent, or Firm* — Moore & Van Allen PLLC; Henry B. Ward, III

(57) ABSTRACT

A system for providing data communication over a MoCA (Multimedia over Coaxial Alliance) network in a construction complex, the system comprising a coaxial network; a network management device connectable to an external data channel, the network management device comprising a connector structured to be connected to the coaxial network; and a control unit having a first MoCA chip, wherein the control unit is configured to establish an access function, creating a control channel over the coaxial network to one or more MoCA end devices; and at least one MoCA end device connected to the coaxial network, wherein the at least one MoCA end device has a second MoCA chip and a network access unit connected to a bus on the second MoCA chip.

18 Claims, 3 Drawing Sheets

(52) U.S. Cl.
CPC ......... *H04N 21/6168* (2013.01); *H04L 41/08* (2013.01); *H04W 84/12* (2013.01)

(56) References Cited

U.S. PATENT DOCUMENTS

| | | |
|---|---|---|
| 2015/0095961 A1 | 4/2015 | Kliger et al. |
| 2015/0327175 A1* | 11/2015 | Klein ..................... H04L 12/12 370/311 |
| 2016/0105712 A1 | 4/2016 | Venes et al. |

OTHER PUBLICATIONS

International Search Report for co-pending PCT Application No. PCT/EP2017/061252 completed Jun. 20, 2017.
Written Opinion for co-pending PCT Application No. PCT/EP2017/061252 completed Jun. 20, 2017.

\* cited by examiner

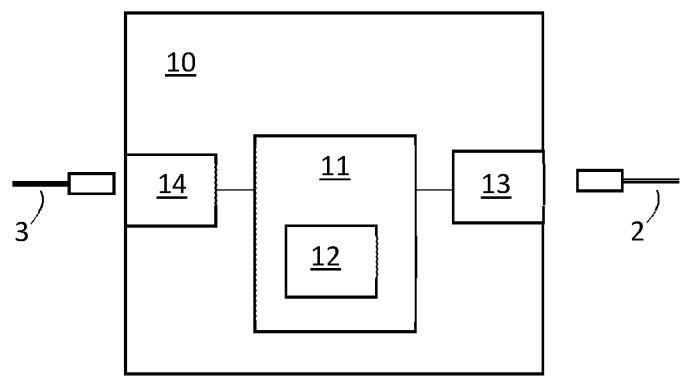
Fig. 3
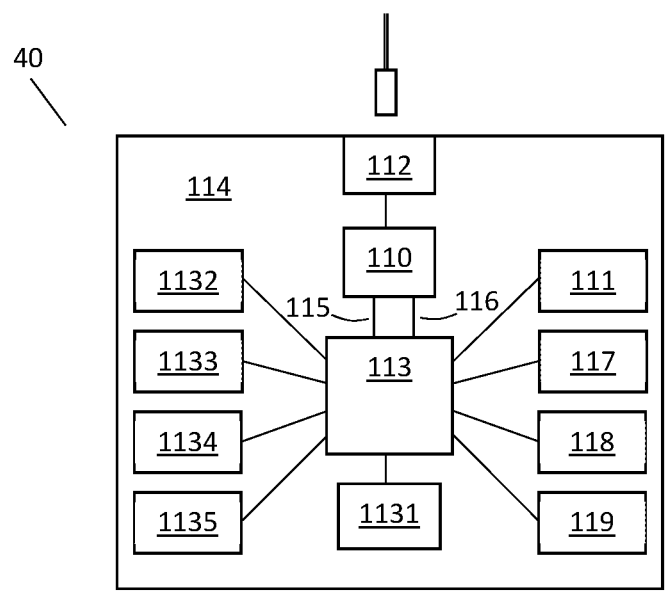
Fig. 4    STATE OF THE ART

SYSTEM FOR PROVIDING DATA COMMUNICATION OVER A COAXIAL NETWORK

FIELD OF THE INVENTION

The present invention relates to the architecture of a system for providing data communication over a coaxial network, and to a network end device for connection to a coaxial network in such a system. More specifically it relates to improvements in deployment of a MoCA (Multimedia over Coaxial Alliance) network.

BACKGROUND

Since television became a commodity in homes, hotels, offices and other buildings, coaxial (coax in short) networks have regularly been implemented in such facilities. As a result, a large percentage of such facilities built in developed countries during at least the last 50 years are provided with such coaxial networks. Provision of signal access to a building has been accomplished in different ways throughout the years, from the early solution with a local antenna receiver to wired cable TV connection, and later optical fiber networks. Still, there is a need to distribute access within the building, for which the local coaxial network may be used.

Multimedia over Coaxial Alliance (MoCA) is an industry standard alliance developing technology for the connected home. MoCA technology runs over the existing in-home coaxial cabling, enabling whole-home distribution of digital content. MoCA provides the backbone for the home digital entertainment network, and supports streaming media such as standard television and allows linking a set-top box to a TV and other entertainment such as computers or game consoles in multiple rooms using existing wiring.

MoCA is designed and used for providing data access within a home. To operate and gain access to an exterior network provider, a MoCA end device is required. The MoCA end device may be a MoCA adapter or modem, having at least a coaxial connector for connection to the coaxial network, and a network output, such as an Ethernet switch. The end device further includes a MoCA chip or chipset, configured to control media-sharing in accordance with one or more of the MoCA specifications, in cable-equipped households. However, each such MoCA end devices has a relatively high level of complexity, which results in a high cost of production and configuration.

SUMMARY

An improved system for providing data communication over a MoCA network, and a MoCA end device configured for operation in such a system, are provided in accordance with the appended claims.

In current MoCA end device designs, a host device including a microcontroller or microprocessor device, is always present. The host device function as a translator for received configuration messages and communication to various network devices and other circuitry on the printed circuit board (PCB). This demands complexity on the PCB for the host device to function and requires that code for the host functionality must be independently developed for every particular MoCA modem type. This creates both design and production related costs, and time to market increases.

In the system provided herein, MoCA technology is employed for providing data access to a plurality of independent user entities connected to a common coaxial network. This way, an already present coaxial network in e.g. a multi-family house, a hotel etc., can be employed for providing access to an external physical broadband data channel, such as an optical fiber cable. A network management device connects an external data channel to the coaxial network, and the management device is configured with a MoCA chip. One or more connected MoCA end devices are connected to the coaxial network, each comprising a MoCA chip. In this case, multiple modems on the same channel share the same access medium, i.e. the coaxial network. Configuration of each MoCA modem is in this MoCA access application crucial for enabling access to the external access network, securing network traffic isolation of individual access modems, assuring Quality of Service (QoS), and configuring other functionalities related to network parameters normally found in network chip devices. In the proposed solution, a control unit comprising the MoCA chip in the network management device is configured to establish an access function, creating a control channel over the coaxial network to each connected MoCA end device. In the MoCA end devices, a network access unit is connected to a bus on the MoCA chip. This way, hardware signals triggered from the access function are input/output on the MoCA chip and via a bus directly to the network access unit in the MoCA end device This creates a possibility to manufacture and design much less expensive MoCA Access modems. The savings consist of both reduced component count and reduced development time.

BRIEF DESCRIPTION OF THE DRAWINGS

Embodiments are described below with reference to the accompanying drawings, in which:

FIG. 3 schematically illustrates a network management device for use in a system for providing data communication over a MoCA network;

FIG. 4 schematically illustrates a MoCA end device, such as a network adapter, according to the state of the art.

DETAILED DESCRIPTION

The invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected" to another element, it can be directly connected to the other element or intervening elements may be present. In contrast, when an element is referred to as being "directly connected" to another element, there are no intervening elements present. Like numbers refer to like elements throughout. It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Well-known functions or constructions may not be described in detail for brevity and/or clarity. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Embodiments of the invention are described herein with reference to schematic illustrations of idealized embodiments of the invention. As such, variations from the shapes and relative sizes of the illustrations as a result, for example, of manufacturing techniques and/or tolerances, are to be expected. Thus, embodiments of the invention should not be construed as limited to the particular shapes and relative sizes of regions illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape of a region of a device and are not intended to limit the scope of the invention.

Figure 1:
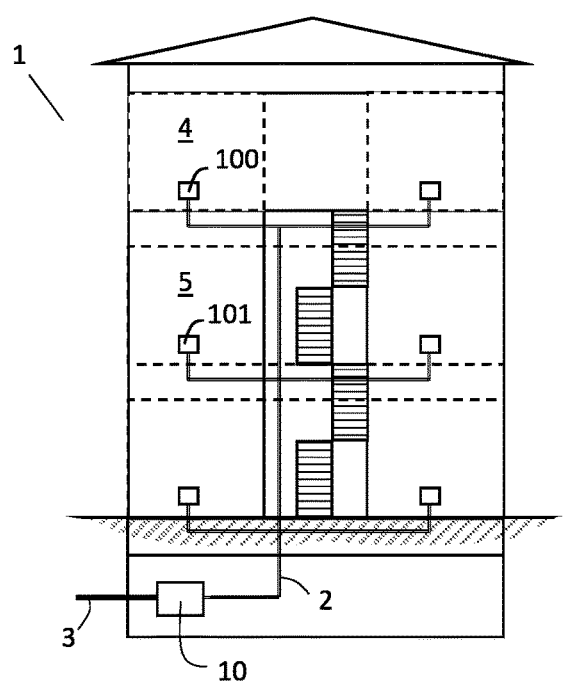
FIG. 1 schematically illustrates deployment of a system for providing data communication over a MoCA network in a construction complex.

FIG. 1 illustrates, by way of example, a construction complex 1 in the form of a single building. For the sake of completeness, it may be noted that the invention as described herein may be employed in a construction complex comprising a plurality of buildings having a common coaxial network, or interconnected coaxial networks. The construction complex 1 may e.g. be a block of apartments or a hotel. In the construction complex, a number of separate building units, such as apartments, hotel rooms, offices etc. are indicated by means of dashed lines. A coaxial network 2 is provided in the construction complex 1, having sockets in all or a plurality of the different building units, such as building units 4 and 5. Both apartment buildings and hotels normally have a coaxial network covering all apartments or hotel rooms for TV signal distribution. These cables can also be used for high speed Internet access, IPTV, VoIP, Web-TV services etc. without affecting the TV signal quality. In the proposed solution, a network management unit 10 is connected to the coaxial network 2, and connected to external data channel 3, such as a supply data cable or an optical fiber. The network management device 10 may e.g. be installed in a basement, as illustrated, or on a loft of the building 1, and may be connected after a TV amplifier. The network management device 10 makes use of the previously un-used frequency spectrum above the regular TV spectrum (5-790 MHz) in coaxial cables for data transportation. The network management device 10 is configured to merge an incoming data stream from the external data channel 3 and a TV-signal, where applicable, into the same cable and to send it through the coaxial network 2. At the other end of the coaxial network 2, the signals are divided by an end device 100, 101, such as an access modem, operating under a MoCA specification. Since the data stream and TV-signal are using separate frequency spectrums, the TV signal is effectively isolated from the data stream.

Figure 2:
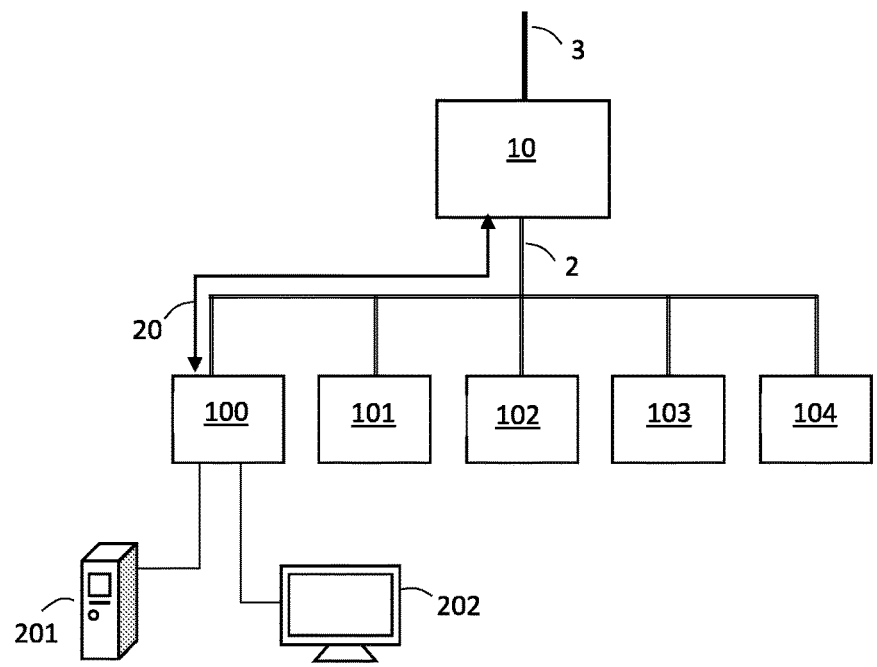
FIG. 2 schematically illustrates is a principle view of a system according to FIG. 1.

FIG. 2 illustrates the basic architectural structure of a system according to one embodiment, where the network management device 10 is shown at the top, connected between an external data channel 3 and a coaxial network 2. A plurality of MoCA end devices 100-104 are connected to the coaxial network 2, operable to obtain access to the external data channel 3 through the network management device 10. As an example, a MoCA end device 100 may receive television signals over the coaxial network 2 for output on a connected TV set 202, which may include or be connected through a set top box (not shown). In addition, the MoCA end device 100 may be configured to provide network access to a connected computer 201, usable for receiving multimedia data. The MoCA end device 100 may further comprise a wireless access point, for radio access to the MoCA end device 100 from various portable radio communication devices such as computers, mobile phones, tablets etc. Further configuration and operation of the system will be described with reference to the drawings of the network management device 10 and MoCA end device 100, respectively, by way of example.

FIG. 3 schematically illustrates the network management device 10 in one embodiment, comprising a connector 14 for connection to an external data channel 3, such as an optical fiber or other physical carrier of broadband data. At the other end of the network management device 10, a connector 13 is provided for connection to a coaxial network 2. A control unit 11 is provided in the network management device 10, inter alia for controlling communication with MoCA end devices connected to the coaxial network 2. For this purpose, the control unit 11 includes MoCA chip 12. A MoCA chip is the hardware chip implementing the MoCA protocol and the HW required for fulfilling the MoCA specification, and such chips are available on the market. Hardware content in the MoCA chip typically includes baseband radio/power amplifier & Low noise amplifier, mixers, RF-switches, microprocessor, clock circuitry and an Ethernet packet bus of some type. MoCA chip makers apply the MoCA specification to the chip design by selection of chip content required to fulfill specification. This may vary depending on MoCA Specification version, of which currently versions 1.0, 1.1, 2.0, 2.5 exist. In the network management device, the control unit 11 is operated to control a MoCA chip in the connected MoCA end devices 100, and to access devices connected to the MoCA chip in such MoCA end devices 100. In the network management device 10, CATV and MoCA channels may be combined in a combiner (not shown) which is a frequency band selective device. The combiner may combine several MoCA channels and several CATV channels to be distributed to the same coaxial network 2. A network management device 10 may have several MoCA channels of different frequencies connected to a combiner and distributed to the coaxial network 2. The CATV signals may be origin from a satellite system, terrestrial TV system, fiber optical CATV distribution network or other source of CATV.

FIG. 4 schematically illustrates a MoCA end device 40 according to the state of the art, such as an MoCA modem or network adapter. Such a MoCA end device 40 includes a plurality of components, connected to one or more PCBs 114, held in a case (not shown). A connector 112 is provided for connection to a coaxial network 2. The coax connector 112 is connected to a MoCA chip 110. The MoCA chip, in turn, is connected with a management data clock (MDC)/management data input/output (MDIO) interfaces 115 and an Ethernet bus 116 from General-purpose input/output (GPIO) to a host device 113. The host device 113 may be connected with one or more of a Double Data Rate (DDR) memory 1131, host clock circuitry 1132, a boot memory 1133, an operating system memory 1134, and a power supply 1135 for host components and filters. In this state of the art setup, the host device 113 is a master and the MoCA device 110 is a slave. The host device, typically a microprocessor or microcontroller, translates data communication from the MoCA device to all other connected hardware devices, such as indicated devices 111, 117-120, which may include a memory 117 connected by a Serial Peripheral Interface (SPI), LED control 118 connected by GPIO, sensors 119 connected through an I2C interface, an Ethernet switch 111 connected through an Ethernet bus, and a Wi-Fi access point (not shown).

As mentioned, this configuration of the MoCA end device entails a high level of complexity on the PCB 114 for the host device to function properly, and requires that code for the host functionality must be independently developed for every particular MoCA end device type. This creates a lot of design and production related costs and time to market increases. In addition, multiple end devices on the same channel share the same access medium (coaxial cable channel, i.e. network) in a setup as indicated in FIG. 2. Configuration of each MoCA end device is in this MoCA access application crucial for enabling access to the external access network 3, securing network traffic isolation of individual MoCA end devices 100-104, assuring Quality of Service (QoS), and e.g. configuring other functionalities related to Ethernet network parameters found in an Ethernet switch.

Figure 5:
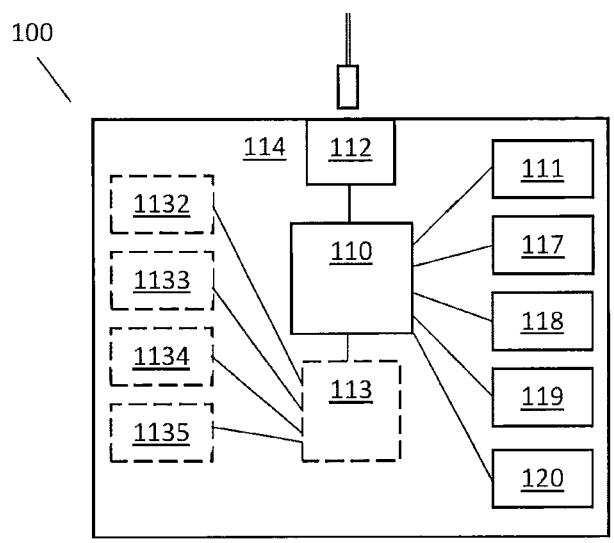
FIG. 5 schematically illustrates a MoCA end device for use in a system for providing data communication over a MoCA network according to FIG. 2.

FIG. 5 illustrates a MoCA end device 100 according to one embodiment, for use in the system shown in FIGS. 1 and 2. Also in this configuration, the coax connector 112 is connected to a MoCA chip 110, which in turn is connected to a host device 113. However, in this configuration, the MoCA chip 110 is the master to the various connected devices, e.g. a Memory(SPI) 117, LED-control(GPIO) 118, a temperature sensor (I2C-bus) 119, a network access device 111, such as an Ethernet switch, and a Wi-Fi Access Point 120, or any other device using a data bus (I2C, SPI, MDC/MDIO, GPIO). The MoCA chip 110 may also be connected to a host 113 over MDC/MDIO, if needed, which in turn may be connected to various devices 1132-1135 as outlined in connection with the description of FIG. 4. This reversed configuration, where the MoCA chip 110 act as a master to bus-connected devices, including the network access device 111, means that the MoCA end device 100 can be produced with lower degree of complexity, since the host need not be programmed specifically with regard to the various devices 111, 117-120 on the PCB 144, connected to the MoCA chip 110. Instead, each connected device 111, 117-120 may be addressed specifically over a control channel on the coaxial network, from the MoCA chip 12 in the network management device 10.

Returning to FIG. 2, control of connected MoCA end devices 100 by means of the network management device 10 will now be described for an embodiment of the system. The solution proposed herein identifies the market standard hardware protocols required to successfully configure and use most hardware devices on the electronics market. The common protocols used on the market are MDIO (Management Data Input/Output) which is described in IEEE802.3-Sub Clause 22.2.4.5, I2C (Inter-Integrated Circuit) which is described in NXP-UM10204 and SPI (Serial Peripheral Interface) which was originally developed by Motorola but has been adopted by many chip manufacturers on the market as a de facto standard. MDIO is mainly used for communication with Ethernet devices. I2C uses a two wire bus and are commonly used for simpler devices like sensors, real time clocks, analog-to-digital converters etc. SPI is commonly used for memories and high speed devices but can also be used for simpler devices. These three hardware protocols compose the majority of the current market implemented standards for communicating to hardware devices.

In a preferred embodiment, an ACCESS function is implemented in the network management device 10 and on MoCA end devices 100, by the control unit 11 and in the MoCA chips 12, 110. The access function nomenclature includes three software parts. One is implemented in the MoCA chip 12 on the management device 10 and one is implemented in the MoCA chip 110 on the MoCA end device 100. The software implementation in the MoCA chips 12,110 enables bidirectional data transfer over the communication channel 20, also referred to as control channel, to all connected MoCA end devices 100, 40. Specifically the MoCA chip 110 where a software application interprets the received data and executes hardware functions, e.g. MDIO, I2C, SPI, GPIO commands. The control channel 20 can be an existing control channel like L2ME already existing in the MoCA specification; but data can also be transferred in numerous ways both inside the MoCA protocol and in the form of Ethernet packets and this invention shall not be limited by the method and/or protocol of data transfer between MoCA chips. A third software part is an API (Application Programming Interface) implemented on the control unit 11 on the management device 10. This API enables direct access to hardware devices 111, 117-120 on the MoCA end device 100. The control unit 11 is communicating over the API with the MoCA chip 12 over MDIO or an Ethernet bus. A command argument flag enables differentiation between individual MoCA end devices communicated with. This enables the configuration process of MoCA end device 10 to be moved from the host device 113 to the control unit 11. The availability of the hardware buses on a MoCA end device 100 from the control unit 11 will be transparent, meaning that a hardware/software developer can work with development of hardware/software functions on the MoCA end device 100,40 from the control unit 11 like if they were directly controlling a host device 113 connected to various devices 111,117-120. Since a host device 113 is hereby not needed, software development for a MoCA end device 100 can be addressed on the control unit 11 only.

The established channel 20 may be set up using an existing MoCA process. MoCA provides a layer 2 communication protocol that may be used for management and monitoring called MoCA Level 2 Management Entity (L2ME), and is an integral part of MoCA protocol. Another layer-2 protocol that can be used for management and monitoring of MoCA Nodes is the IEEE 1905 standard. In another embodiment tested by the applicant employs unused MoCA management and statistics word fields which transports raw data between a management device 10 and an end device 100 with regular intervals. A custom communication protocol is implemented around this raw data transportation which transports frames with configuration commands to the end devices 100. The configuration command is interpreted by a host on the end device 100 which further configures the Ethernet switch 111 or any of the other devices 117-120. An end device 100 can also send current configuration status through the communication channel and inform the management unit 10.

The hw signals triggered from the ACCESS function are input/output on the MoCA chip 110 on the MoCA end device 100. Preferably, an application frame format is applied in the network management device 10 which targets the MoCA chip 110 buses directly. This way, a benefit of connecting the MoCA chip 110 in the MoCA end device 100 directly to various devices such as an Ethernet switch 111, rather than through a translating host device, will be readily apparent.

In one embodiment an application frame format is applied in the ACCESS function for MDIO Commands. The following function arguments may be employed in this context:

-w: write from MoCA chip 110 connected to Ethernet switch 111 over MDIO bus
-r: read from Ethernet switch 111 connected to MoCA chip 110 over MDIO bus
-i: Node ID {1,2,3, . . . ,63} of remote MoCA chip 110 and thereby MoCA end device 100
-a: Physical address of Ethernet switch 111 on remote MoCA end device 100 (several Ethernet devices can be addressed)
-s: Register address in Ethernet switch 111 on MoCA end device 100
-h: Set GPIO high on MoCA Chip 110
-l: Clear GPIO low on MoCA Chip 110
-v: Read GPIO on MoCA Chip 110

In accordance with this principle, any device connected to the MDIO bus on the

MoCA chip 110 can be addressed using a -a flag. As one example, where the object is to write to NodeID (MoCA end device 100) 3, with Ethernet switch 111 physical address 2, in Ethernet switch 111 register 1, the data =0x12345678, the command may be:

Access -i 3 -w -a 0x02 -s 0x01 0x12345678

Conversely, where the object is to read the data from NodeID 3, with Ethernet switch 111 physical address 2, register 1, the command may be:

Access -i 3 -r -a 0x02 -s 0x01
The response could then be: 0x12345678
Corresponding commands may be employed for GPIO:
GPIO set:
Access -i 3 -h 3
GPIO clear:
Access -i 3 -l 3
GPIO read:
Access -i 3 -v 3

Preferably, the ACCESS function must validate recipient of command, i.e. Node device # must respond OK, but the command itself must not be validated. In other words, a write command must not be validated, instead a read command may be issued to validate the write command.

In one embodiment, the MoCA chip 110 comprises at least one MDC/MDIO port, preferably implemented as per Ethernet sub clause 22.2.4.5. This is the standard that almost all Ethernet network switches use and implement. Through this channel all configuration of a MoCA network access modem realized through the network access unit 111 can be achieved. Several Ethernet devices can be addressed through a physical address parameter -a to differentiate between devices.

The MoCA chip should further comprise at least one GPIO port, for use to SET/CLEAR/READ. With these commands common signals like network device reset, self-reset, LED-control, etc. can be configured and controlled actively. SET or CLEAR makes the port an output (driver enabled) while a read command makes the port an input (driver disabled).

The MoCA chip may further include a I2C (Inter-Integrated Circuit) port, using a HW protocol is commonly used by various memory devices and sensors. This port may be emulated in SW by the GPIO port above.

The MoCA chip may further include an SPI (Serial Peripheral Interface) port, operating under a HW protocol commonly used by various memory devices and sensors. This port could be emulated in SW by the GPIO port above.

In addition, other communication buses may, where applicable, be SW emulated by the GPIO port above.

The MoCA system and end device, which have been described by reference to various embodiments above, provide solutions for convenient network access through a coaxial network to an external data channel. The proposed solutions have several benefits over the state of the art. Specifically, the system solution is advantageous were a plurality of MoCA end devices which are associated with different user entities, such as different subscribers, persons, companies, hotel rooms etc., with independent data access are connected to a common coaxial network. The proposed solutions move software development to the network management unit side and reduces complexity in the MoCA end device configuration. By means of the novel configuration of the MoCA end device, such as a modem or network adapter, no software development required in R&D process. This reduces cost and time to market, as well as reducing size, weight and power consumption of the MoCA end device.

The description given above relates to various general and specific embodiments, but the scope of the invention is limited only by the appended claims.

The invention claimed is:

1. A system for providing data communication over a MoCA (Multimedia over Coaxial Alliance) network in a construction complex, the system comprising:
 a coaxial network;
 a network management device connectable to an external data channel, the network management device comprising:
  a connector structured to be connected to the coaxial network; and
  a control unit having a first MoCA chip, wherein the control unit is configured to establish an access function, creating a control channel over the coaxial network to one or more MoCA end devices; and
 at least one MoCA end device connected to the coaxial network, wherein the at least one MoCA end device has a second MoCA chip and a network access unit connected to a bus on the second MoCA chip.

2. The system of claim 1, wherein the at least one MoCA end device is associated with a unique user entity with independent data access.

3. The system of claim 2, wherein said access function is configured to separately address the at least one MoCA end device.

4. The system of claim 1, wherein said access function is configured to specifically address the bus on the second MoCA chip and wherein the bus on the second MoCA chip is directly connected to said network access unit.

5. The system of claim 1, wherein the network access unit is an Ethernet switch or Ethernet PHY (Physical Layer) chip.

6. The system of claim 1, wherein the at least one MoCA end device comprises one or more additional hardware devices directly connected to the bus on the second MoCA chip.

7. The system of claim 6, wherein the one or more additional hardware devices comprise a Wi-Fi access point.

8. The system of claim 1, wherein the at least one MoCA end device has a coaxial connector for connection to the coaxial network.

9. The system of claim 8, wherein the second MoCA chip is configured to receive addressed control commands from the network management device over the coaxial network, and wherein the control commands specify the bus on the second MoCA chip.

10. The system of claim 8, wherein the at least one MoCA end device has a PCB (Printed Circuit Board) connected to the second MoCA chip, and wherein the network access unit is an Ethernet switch or Ethernet PHY (Physical Layer) chip.

11. The system of claim 8, wherein the at least one MoCA end device has one or more additional hardware devices directly connected to the bus on the second MoCA chip.

12. The system of claim 8, wherein the one or more additional hardware devices comprise a Wi-Fi access point.

13. The system of claim 2, wherein the network access unit is an Ethernet switch or Ethernet PHY (Physical Layer) chip.

14. The system of claim 3, wherein the network access unit is an Ethernet switch or Ethernet PHY (Physical Layer) chip.

15. The system of claim 4, wherein the network access unit is an Ethernet switch or Ethernet PHY (Physical Layer) chip.

16. The system of claim 6, wherein the network access unit is an Ethernet switch or Ethernet PHY (Physical Layer) chip.

17. The system of claim 7, wherein the network access unit is an Ethernet switch or Ethernet PHY (Physical Layer) chip.

18. The system of claim 1, wherein said bus is an Ethernet bus.

* * * * *